(12) United States Patent
Sato

(10) Patent No.: US 7,451,111 B2
(45) Date of Patent: Nov. 11, 2008

(54) QUEUING EXEMPTION METHOD, QUEUING PLACE-TAKING METHOD AND AUCTION SYSTEM

(76) Inventor: Yasuyuki Sato, 791-50, Ohaza Mizuno, Saitama Prefecture, Sayama City (JP)

( * ) Notice: Subject to any disclaimer, the term of this patent is extended or adjusted under 35 U.S.C. 154(b) by 1351 days.

(21) Appl. No.: 10/266,881

(22) Filed: Oct. 7, 2002

(65) Prior Publication Data

US 2003/0074276 A1 Apr. 17, 2003

(30) Foreign Application Priority Data

Oct. 15, 2001 (JP) ............................. 2001-316311

(51) Int. Cl.
*G06Q 30/00* (2006.01)
(52) U.S. Cl. .......................................... 705/37; 705/35
(58) Field of Classification Search .................... 705/37, 705/38, 8
See application file for complete search history.

(56) References Cited

U.S. PATENT DOCUMENTS

| | | | | |
|---|---|---|---|---|
| 5,946,388 | A * | 8/1999 | Walker et al. | 379/266.01 |
| 6,059,184 | A * | 5/2000 | Ahlstrom et al. | 235/375 |
| 6,203,217 | B1 * | 3/2001 | Glogovsky | 396/564 |
| 6,292,896 | B1 * | 9/2001 | Guski et al. | 713/169 |
| 6,310,952 | B1 * | 10/2001 | Baldwin et al. | 379/266.01 |
| 6,421,651 | B1 * | 7/2002 | Tedesco et al. | 705/8 |
| 6,435,406 | B1 * | 8/2002 | Pentel | 235/380 |
| 6,519,570 | B1 * | 2/2003 | Faber et al. | 705/8 |
| 6,748,364 | B1 * | 6/2004 | Waytena et al. | 705/5 |
| 2001/0042041 | A1 * | 11/2001 | Moshal et al. | 705/37 |
| 2002/0022896 | A1 * | 2/2002 | Dugan | 700/83 |

FOREIGN PATENT DOCUMENTS

| JP | 2001265963 | 9/2001 |
|---|---|---|
| JP | 2001283117 | 10/2001 |

* cited by examiner

*Primary Examiner*—James P. Trammell
*Assistant Examiner*—Hai Tran
(74) *Attorney, Agent, or Firm*—Caesar, Rivise, Bernstein, Cohen & Pokotilow, Ltd.

(57) ABSTRACT

In order to exchange waiting time, troublesomeness, and labor incurred in the receiving of goods and services with a monetary value, and acquire a priority with respect to the provision of goods and services, an auction system receives bids for queuing exemption rights from bidder terminals, decides upon a successful bidder for the queuing exemption rights, sends an exemption rights password corresponding to the queuing exemption rights to the terminal of the decided upon bidder, and sends the exemption rights password to an exemption rights authentication system. When the exemption rights authentication system acquires the exemption rights password from the successful bidder, the exemption rights password acquired from the successful bidder and the exemption rights password acquired from the auction system are collated, and when the result of this collation is a match, a signal indicating that the result of this collation is a match is outputted to exemption notification means.

3 Claims, 9 Drawing Sheets

| QUEUEING EXEMPTION RIGHTS | EXEMPTION RIGHTS PASSWORD |
|---|---|
| . . . . | . . . . |

(B)

| BIDDER IDENTIFICATION INFORMATION | SETTLEMENT INFORMATION |
|---|---|
| . . . . | . . . . |

Fig. 4

```
SUCCESSFUL BIDDER NAME:       CONCERT TICKET ○○○ PERFORMANCE
TO BE HELD AT:                JAPAN MILITARY ARTS BUILDING
FROM:                         7PM ON THE OF, 2001
AMOUNT BID:                   ○○○○ YEN
TIME OF SUCCESSFUL BID:       22:50 ON THE OF, 2001
PROVIDER:                     ○○
EXEMPTION RIGHTS PASSWORD:    f 1 2 5 e 8 4 5
       ·                             ·
       ·                             ·
       ·                             ·
```

| QUEUEING PLACE-TAKING RIGHTS | PROVIDING AUTHENTICATION INFORMATION | SUCCESSFUL BIDDER AUTHENTICATION INFORMATION |
|---|---|---|
|  |  |  |

(B)

| QUEUEING PLACE-TAKING RIGHTS | PROVIDING SIDE PLACE-TAKING RIGHTS PASSWORD | SUCCESSFUL BIDDER PLACE-TAKING RIGHTS PASSWORD |
|---|---|---|
| ⋮ | ⋮ | ⋮ |

| | |
|---|---|
| SUCCESSFUL BIDDER NAME | ○○ RESTARUNT |
| LOCATION OF QUEUE | □□ |
| TIME OF QUEUE | 17:00 ON THE OF |
| PROVIDING AUTHENTICATION INFORMATION | PROVIDER NAME, ATTIRE, STTIRE, FIGURE, SEX, AND HIGHT OF PROVIDER |

FACIAL PICTURE

| | |
|---|---|
| SUCCESSFUL BIDDER SIDE PLACE-TAKING RIGHTS PASSWORD | A A A 1 A |
| AMOUNT BID: | ○○○ YEN |

INPUT COLUMN (B)

| | |
|---|---|
| SUCCESSFUL BIDDER NAME | ○○ RESTARUNT |
| AMOUNT BID: | ○○○ YEN |
| PROVIDER SIDE PLACE-TAKING RIGHTS PASSWORD | B B B 1 B |
| SUCCESSFUL BIDDER AUTHENTICATION INFORMATION | SUCCESSFUL BIDDER NAME, ATTIRE, STTIRE, FIGURE, SEX, AND HIGHT OF SUCCESSFUL BIDDER |

FACIAL PICTURE

INPUT COLUMN ns # QUEUING EXEMPTION METHOD, QUEUING PLACE-TAKING METHOD AND AUCTION SYSTEM

BACKGROUND OF THE INVENTION

1. Field of the Invention

The present invention relates to a queuing exemption method and queuing place-taking method for receiving the provision of goods and services.

2. Description of Related Art

Typically, it has been common for tickets for popular items such as game software or watches, etc. or scarce merchandise, or sports events and concerts or for amusement parks etc. to be purchased through a process of queuing.

However, the result of the aforementioned related art example is that it becomes necessary for people who do not have much spare time to line up in a queue in order to purchase the above goods or tickets, with people who have time being at the front. It is then not possible for people who do not have much spare time to put aside the time to line up in the queue and are therefore inconvenienced to the extent of not being able to purchase the goods or tickets.

In the related art example, even if a person waiting in line gives up on acquiring the goods or ticket midway, it is not possible to change this queuing with a third party, and as a result, the person has wasted their time spent waiting in the queue.

It is therefore the object of the present invention to provide for the aforementioned situation to provide a queuing exemption method and queuing place-taking method for exchanging waiting time, troublesomeness, and labor incurred in the receiving of goods and services for a monetary value so as to acquire a priority with respect to the provision of goods and services.

SUMMARY OF THE INVENTION

In order to achieve the aforementioned object, in the first claim of the present invention there is provided a queuing exemption rights method, comprising: bidders terminals, an auction system for queuing exemption rights the bidders bid for, and an exemption rights authentication system for confirming that a successful bidder who has bid for the queuing exemption rights is who they say they are. The bidder terminals then a) execute a step of sending bids for queuing exemption rights to the auction system. The auction system then b) executes a step of receiving bids for queuing exemption rights from the bidder terminals, deciding upon a successful bidder for the queuing exemption rights, sending an exemption rights password corresponding to the queuing exemption rights to the terminal of the decided upon successful bidder, and sending an exemption rights password to the exemption rights authentication system. The exemption rights authentication system then c) executes a step of acquiring the exemption rights password from the successful bidder, collating the exemption rights password acquired from the successful bidder and the exemption rights password acquired from the auction system, and when the result of this collation is a match, outputting a signal indicating that the result of this collation is a match to the exemption notification means in order to permit exemption from the queue.

Here, "queue" refers to the application to situations where congestion or waiting in order occurs in order to receive provision of goods and services in cases where demand is greater than supply, and in addition to people actually waiting in line in a queue, also includes the broader definition of conceptual congestion and waiting in order. "Queuing exemption rights" refers to a right to receive the provision of goods or services without having to wait in line or, in addition to actually lining up in a queue, without having to take part in complex procedures such as waiting in order, or reserving or ordering tickets. This may therefore correspond to, for example, a right to acquire popular products such as watches, toys or game software etc. or entrance tickets to concert halls without having to wait in a line. The "exemption notification means" may be any kind of means for providing notification of exemption, and may, for example, be a display displaying an indication in the case of exemption, an entrance gate that opens in the case of exemption, or an audio output device for outputting audio in the case of exemption, etc. "Exemption rights password" may include information for confirming that a user is the correct user, and may correspond to barcodes, etc. in addition to code such as numerals and characters.

First, in the present invention, an auction system decides upon a successful bidder for queuing exemption rights. The exemption rights authentication system then authenticates the aforementioned exemption rights password and outputs a signal indicating that the results of a collation is a match to exemption notification means. The successful bidder can then receive the provision of goods and services without having to wait by acquiring the queuing exemption rights.

In the second claim of the invention, the present invention is further provided with a queue place-taking method comprising a terminal of a provider waiting in a queue to receive provision of goods/services, a system for auctioning queuing place-taking rights to take the place of the provider in a queue, and terminals of bidders bidding for the queuing place-taking rights. The bidder terminals a) execute a step of sending bids for the queuing place-taking rights to the auction system, and the auction system b) executes a step of receiving bids for the queuing place-taking rights from the bidder terminals, deciding upon a successful bidder for the queuing place-taking rights, sending a successful bidder side place-taking rights password corresponding to the queuing place-taking rights and provider authentication information for confirming the provider waiting in the queue to the terminal of the decided upon successful bidder, and sending a provider side place-taking rights password corresponding to the queuing place-taking rights and successful bidder authentication information for confirming the successful bidder to the terminal of the provider. The provider terminal executes a step of c) when the provider is waiting in the queue, correlating the successful bidder side place-taking rights password instructed by the successful bidder with the queuing place-taking rights based on the successful bidder side place-taking rights password sent from the terminal of the successful bidder and provider authentication information, and sending the correlated information to the auction system, and the terminal of the successful bidder executes a step of d) when the provider is waiting in the queue, correlating the provider side place-taking rights password instructed by the provider with the queuing place-taking rights based on the provider side place-taking rights password sent from the terminal of the provider and successful bidder authentication information, and sending the correlated information to the auction system. The auction system executes a step of e) collating the correspondence correlation of the successful bidder side place-taking rights password relating to the queuing place-taking rights received from the provider in step c and the provider side place-taking rights password relating to the queuing place-taking rights received from the terminal of the successful bidder in step d and the correspondence correlation between the successful bidder side place-taking rights password and the provider side place-taking rights password sent in step b, and sends information to the effect that the taking of the place in the queue is permitted to the terminal 2 of the successful bidder and the terminal 6 of the provider when the result of the collation is a match.

Here, "queue" refers to the application to situations where congestion or waiting in order occurs in order to receive provision of goods and services in cases where demand is greater than supply, and in addition to people actually waiting in line in a queue, also includes the broader definition of conceptual congestion and waiting in order. "Queuing place-taking rights" are a right to take the place of a person in a queue who has been waiting in line in order to receive the provision of goods or services. Queuing place-taking rights may be, for example, the right to take the place of a person lining up in a queue in order to purchase popular watches or bags etc., or to take the place in a queue of a person lining up in order to receive a service such as the services of a popular restaurant, etc. "Place-taking rights password" may include information for confirming that a user is the correct user, and may correspond to barcodes, etc. in addition to code such as numerals and characters.

In the present invention, an auction system decides upon a successful bidder for queuing place-taking rights, collates a correspondence correlation of a successful bidder side password corresponding to the place-taking rights and a provider side password and sends information indicating that the giving up of a place in the queue is permitted to the terminal of the successful bidder and/or the terminal of the provider. It is therefore possible for the successful bidder to take a place in a queue and receive the provision of goods and services by successfully bidding for the right to change places in a queue and the provider can receive remuneration for the waiting time.

In a third claim of the invention, the auction system used in claim 1 of the invention is provided with exemption rights storage means for storing a correlation between queuing exemption rights and an exemption rights password, exemption rights storage means for storing bidding conditions for successfully bidding for the queuing exemption rights, and means for communicating with external devices, and information processing means for controlling the operation of each means. The processing means executes the steps of a) receiving bids for the queuing exemption rights via the communication means, b) deciding upon a bidder for which a bid is received satisfying the successful bidder conditions stored in the successful bid conditions storage means as the successful bidder, c) reading an exemption rights password corresponding to the queuing exemption rights which the decided successful bidder has successfully bid for from the exemption rights storage means and d) sending the read-out exemption rights password to the terminal of the successful bidder decided in step b. The processing means also e) determines whether or not the successful bidder professing to be the person in question is the same person as the successful bidder decided in step b and sends the exemption rights password read out in step c to the external exemption rights authentication system via the communication means in order to determine the queuing exemption relating to the queuing exemption rights.

In the present invention, the processing means decides upon a successful bidder for the queuing exemption rights and sends an exemption rights password to the terminal of the successful bidder and to the exemption rights authentication system. The successful bidder can therefore receive provision of goods and services without having to wait in line by authenticating the exemption rights password.

In claim 4 of the invention, the auction system disclosed in claim 3 comprises settlement information storage means for correlating and storing bidder identification information and settlement information for settling the bids. The processing means then receives the correlation between a bid for the queuing exemption rights and the bidder identification information via the communication means, and when a successful bidder fulfilling the successful bidding conditions stored in the successful bid conditions storage means is decided upon in step b, reads settlement information relating to the identification information of the successful bidder that has been decided upon from the settlement information storage means, correlates the read settlement information and the bid instructed by the decided upon successful bidder in order to settle the bid instructed by the successful bidder based on the read out settlement information, and sends this to an external settlement system via the communication means.

This settlement method may be any kind of settlement method providing the settlement of the successful bid of the successful bid can be carried out based on the settlement information, and may be, for example, a method where electronic money information such as an account number etc. built-into the successful bidder terminal or a password registered in a pre-paid card is sent to a financial institution.

As a result, the processing means sends the settlement information and the successful bid amount to the settlement system, and settlement of the amount successfully bid can therefore be reliably carried out.

In the fifth claim of the invention, with the auction system of claim 3, the processing means receives information to the effect that the successful bidder decided upon in step b relinquishes the decided upon queuing exemption rights via the communication means, the processing means registers a new exemption rights password corresponding to these queuing exemption rights in the exemption rights storage means so that the queuing exemption rights that are the same as the relinquished queuing exemption rights can be bid for, and the receiving of bids for the queuing exemption rights is commenced.

In this way, it is also possible to take bids for relinquished queuing exemption rights and it is possible for other successful bidders to receive provision of goods and services without having to wait in a line.

In the sixth claim of the invention, with the auction system of the queuing place-taking method of claim 2, the auction system comprises authentication information storage means for correlating and storing queuing place-taking rights enabling changing of places with a provider who is queuing in order to receive goods or services and provider authentication information for confirming the provider waiting in the queue, successful bid conditions storage means for storing successful bid conditions for bidding successfully for queuing place-taking rights, password storage means for correlating and storing a the queuing place-taking rights, the provider side place-taking rights password and the successful bidder side place-taking rights password, means for communicating with external devices, and information processing means for controlling the operation of each means. The processing means then executes the steps of a) receiving bids for the queuing place-taking rights via the communication means, b) deciding upon a bidder for which a bid is received satisfying the successful bidder conditions stored in the successful bid conditions storage means as the successful bidder, c) reading out provider authentication information corresponding to the queuing place-taking rights successfully bid for by the decided upon successful bidder and successful bidder authentication information from the authentication information storage means, and d) reading out a provider side place-taking rights password corresponding to the queuing place-taking rights successfully bid for by the successful bidder decided upon in step b, and a successful bidder side place-taking rights password from the password storage means. The processing means also executes the steps of e) sending the provider authentication information read out in step c and the successful bidder side place-taking rights password read out in step d to the terminal of the successful bidder decided upon in step b, f) sending the successful bidder authentication information read out in step c and the provider side place-taking rights password read out in step d to the terminal of the provider of the queuing place-taking rights successfully bid for by the successful bidder decided upon in step b, g) when the provider is waiting in the queue, making the successful bidder side place-taking rights password instructed by the successful bidder correspond with the queuing place-taking rights based on the successful bidder side place-taking rights password sent form the terminal of the successful bidder in step e and provider authentication information, and receiving the correlated information from the provider terminal via the communication means, h) when the provider is waiting in the queue, making the provider side place-taking rights password instructed by the provider correspond with the queuing place-taking rights based on the provider side place-taking rights password sent from the provider terminal in step f and successful bidder authentication information, and receiving the correlated information from the successful bidder terminal via the communication means. The processing means also executes the steps of j) collating the correspondence correlation of the successful bidder side place-taking rights password relating to the queuing place-taking rights received in step g and the provider side place-taking rights password relating to the queuing place-taking rights received in step h and the correspondence correlation between the successful bidder side place-taking rights password sent in step e and the provider side place-taking rights password sent in step f, and sending information to the effect that the taking of the place in the queue is permitted to the terminal of the successful bidder and the terminal of the provider when the result of the collation is a match.

The "provider authentication information" and "successful bidder authentication information" is information used to increase the degree of safety of the transaction while a transaction for the queuing place-taking rights is taking place between the provider and the successful bidder. The "provider authentication information" is assumed to be, for example, a portrait photograph, the sex and height etc. of a provider and is displayed at the terminal of the successful bidder. The "successful bidder authentication information" is assumed to be, for example, a portrait photograph, the sex and height etc. of the successful bidder and is displayed at the terminal of the provider.

Provider authentication information such as a portrait photograph, the sex and height etc. of the provider is displayed at the terminal of the successful bidder and successful bidder authentication information such as a portrait photograph and the sex and height etc. of the successful bidder is displayed at the terminal of the provider and it is therefore possible for them to confirm each other with their own eyes. It is therefore easy for the people taking part in the transaction to determine the other person with their own eyes, and the degree of safety and reliability of the transaction can therefore be increased.

In the present invention it is possible to receive the provision of goods and services with a successful bidder taking the place of a provider in a line as a result of the processing means deciding upon a successful bidder for the queuing place-taking rights and collating a correspondence correlation between the successful bidder side password corresponding to the place-taking rights and the provider side password.

In claim 7 of the invention, the auction system disclosed in claim 6 comprises settlement information storage means for correlating and storing bidder identification information and settlement information for settling the bids. The processing means then receives the correlation between a bid for the queuing place-taking rights and the bidder identification information via the communication means, and when a successful bidder fulfilling the successful bidding conditions stored in the successful bid conditions storage means is decided upon in step b, reads settlement information relating to the identification information of the successful bidder that has been decided upon from the settlement information storage means, correlates the read settlement information and the bid instructed by the decided upon successful bidder in order to settle the bid instructed by the successful bidder based on the read out settlement information, and sends this to an external settlement system via the communication means.

This settlement method may be any kind of settlement method providing the settlement of the successful bid of the successful bid can be carried out based on the settlement information, and may be, for example, a method where electronic money information such as an account number etc. built-into the successful bidder terminal or a password registered in a pre-paid card is sent to a financial institution.

As a result, the processing means sends the settlement information and the successful bid amount to the settlement system, and settlement of the amount successfully bid can therefore be reliably carried out.

In this manner, the above objects are achieved.

BRIEF DESCRIPTION OF THE DRAWINGS

FIG. 2 is a view of the data structure of the database shown in FIG. 1.

FIG. 4 shows example of a display screen including an exemption rights password.

FIG. 7 is a view of the data structure of the database shown in FIG. 6.

FIG. 9 is a view showing an example screen displaying a successful bidder side place-taking rights password and provider authentication information.

DETAILED DESCRIPTION OF THE PREFERRED EMBODIMENTS

The following is a description based on FIG. 1 to FIG. 9 of the embodiments of the present invention. The following detailed description is only given as an example of preferred embodiments of the present invention and is by no means limiting to the scope of the present invention as laid out in the patent claims. It is also possible for one skilled in the art to adopt substitute means used in normal use.

First Embodiment

Figure 1:
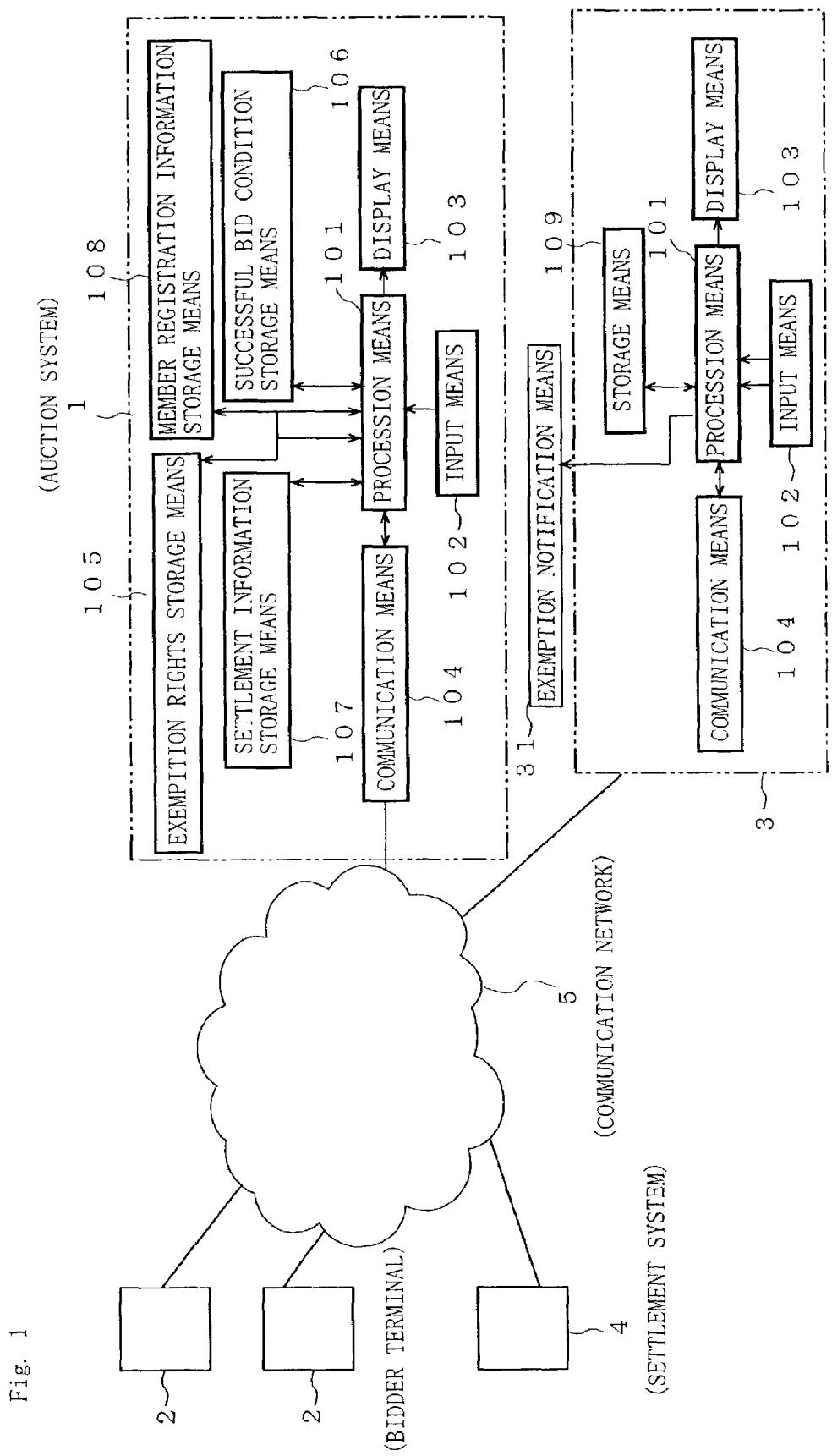
FIG. 1 is a view of the configuration of a system showing a first embodiment of the present invention.

FIG. 1 shows the overall configuration of a first embodiment.

The first embodiment shown in FIG. 1 is provided with bidders terminals 2, an auction system 1 for the queuing exemption rights that bidders bid for, an exemption rights authentication system 3 for confirming that the successful bidder who has bid for the queuing exemption rights is who they say they are, and a settlement system 4 for carrying out settlement processing for the successful bid entered by the successful bidder. In FIG. 1, numeral 5 indicates a communications network which may include an internet network, a LAN, a public line network, a wireless communication network, or a WAN etc.

To describe the above configuration in more detail, the auction system 1, as shown in FIG. 1, comprises processing means 101, input means 102, display means 103, communication means 104, exemption rights storage means 105, successful bid conditions storage means 106, settlement information storage means 107 and member registration information storage means 108.

As shown in FIG. 1, the exemption rights authentication system 3 comprises the processing means 101, input means 102, communication means 104 and information storage means 109.

The processing means 101 includes a CPU. The input means 102 may be a keyboard, touch-sensitive panel or mouse etc. The display means 103 may be a display panel such as a liquid crystal display device, etc. The communication means 104 is a communication interface for transmitting and receiving information and may be, for example, a modem or antenna, etc. The storage means 105, 106, 107, 108 and 109 may be RAM, ROM, or a HDD etc.

A terminal mounted on a computer terminal capable of data communication is acceptable as a bidder terminal 2 but the terminal is by no means limited in this respect, and may also be, for example, a mobile telephone, personal computer, interactive television, household game or PDA, etc.

The exemption rights authentication system 3 may be established at the origin of the provision of goods and services, such as, for example, a shop selling goods, a sports facility, or an amusement park, etc.

The settlement system 4 may be a computer system employed in settlement processing and may be installed in a credit company or a financial institution, etc.

The application of this system therefore enables provision of popular goods and services to be received without it being necessary to line up in a queue.

This is described in detail in the following.

In this embodiment, the member registration information storage means 108 stores information regarding the providers providing of queuing exemption rights and information regarding the registration of members bidding for the queuing exemption rights.

In order to adopt this system, the condition is assumed that providers and bidders are both registered as members. A member ID and password, name and address, contact (for example, mailing address, telephone number, etc.), birthday, and account number etc. may be included in the member registration information.

As shown in FIG. 2(A), an exemption rights database (DB) of the exemption rights storage means 105 stores a correlation between queuing exemption rights and unique queuing exemption rights passwords. A correlation with attribute information of a provider providing the queuing exemption rights information is also stored.

Here, it does not matter what kind of goods or services the queuing rights relate to but in this embodiment it is assumed that the rights are the rights to acquire concert tickets without waiting in line and it is assumed that the exemption rights authentication system 3 is located at a concert hall or ticket shop. The provider in this embodiment is assumed to be a concert promoter.

The queuing exemption rights stored in the exemption rights DB may be rights corresponding to a certain number of products or tickets designated in advance by the vendor or may be rights corresponding to a number of tickets bought through normal channels that have been returned. For example, when a person purchasing concert tickets returns three tickets, the queuing exemption rights corresponding to the three tickets are stored in the exemption rights DB.

Bidding conditions for a successful bid for the queuing exemption rights are stored in the successful bid conditions storage means 106. The bidding conditions may be assumed to be conditions where the successful bid is the highest bid, or where the successful bid is the first bid to reach a predetermined amount, but the present invention is by no means limited in this respect.

As shown in FIG. 2(B), the correlation between identification information such as a bidder-specific ID etc. and settlement information for settling for bidders are stored in the settlement information DB of the settlement information storage means 107. A bidder's name and title, address and residence, method of payment such as credit card, bank payment, payment using paper for making payments, etc., host name of settlement server, account number and e-mail address etc. are included in the settlement information. Here, "DB" is an abbreviation of "database".

The processing means 101 receives bids for the queuing exemption rights via the communication means 104.

The processing means 101 then decides upon a bidder for which a bid is received that satisfies the successful bidder conditions stored in the successful bid conditions storage means 106 as the successful bidder.

The processing means 101 then reads an exemption rights password corresponding to the queuing exemption rights which the decided successful bidder has successfully bid for from the exemption rights DB of the exemption rights storage means 105 and sends the read-out exemption rights password to the terminal 2 of the decided upon successful bidder.

Data is exchanged between the auction system 1 and the bidders terminals 2 by using SSL (Secured Sockets Layer). This means that third parties can be prevented from adding, deleting or modifying and then using the exemption rights password illegally.

The processing means 101 determines whether or not the successful bidder professing to be the person in question is the same person as the decided upon successful bidder and sends the read out exemption rights password to the external exemption rights authentication system 3 via the communication means 104 in order to determine the queuing exemption relating to the queuing exemption rights.

This will now be described further.

The processing means 101 receives the correlation between a bid for the queuing exemption rights and the bidder identification information via the communication means 104. When a successful bidder fulfilling the successful bidding conditions stored in the successful bid conditions storage means 106 is decided upon, settlement information relating to the identification information of the successful bidder that has been decided upon is read from the settlement information DB of the settlement information storage means 107.

The processing means 101 correlates the read-out settlement information and the bid provided by the decided upon successful bidder in order to perform settlement based on the read-out settlement information on the bid provided by the successful bidder, and sends the correlated information to the settlement system 4 via the communication means 104.

When the processing means 101 receives information to the effect that the decided upon successful bidder relinquishes the decided upon queuing exemption rights via the communication means 104, the processing means 101 registers a new exemption rights password corresponding to these queuing exemption rights in the exemption rights storage means 105 so that the queuing exemption rights that are the same as the relinquished queuing exemption rights can be bid for, and the receiving of bids for the queuing exemption rights is commenced.

Figure 3:
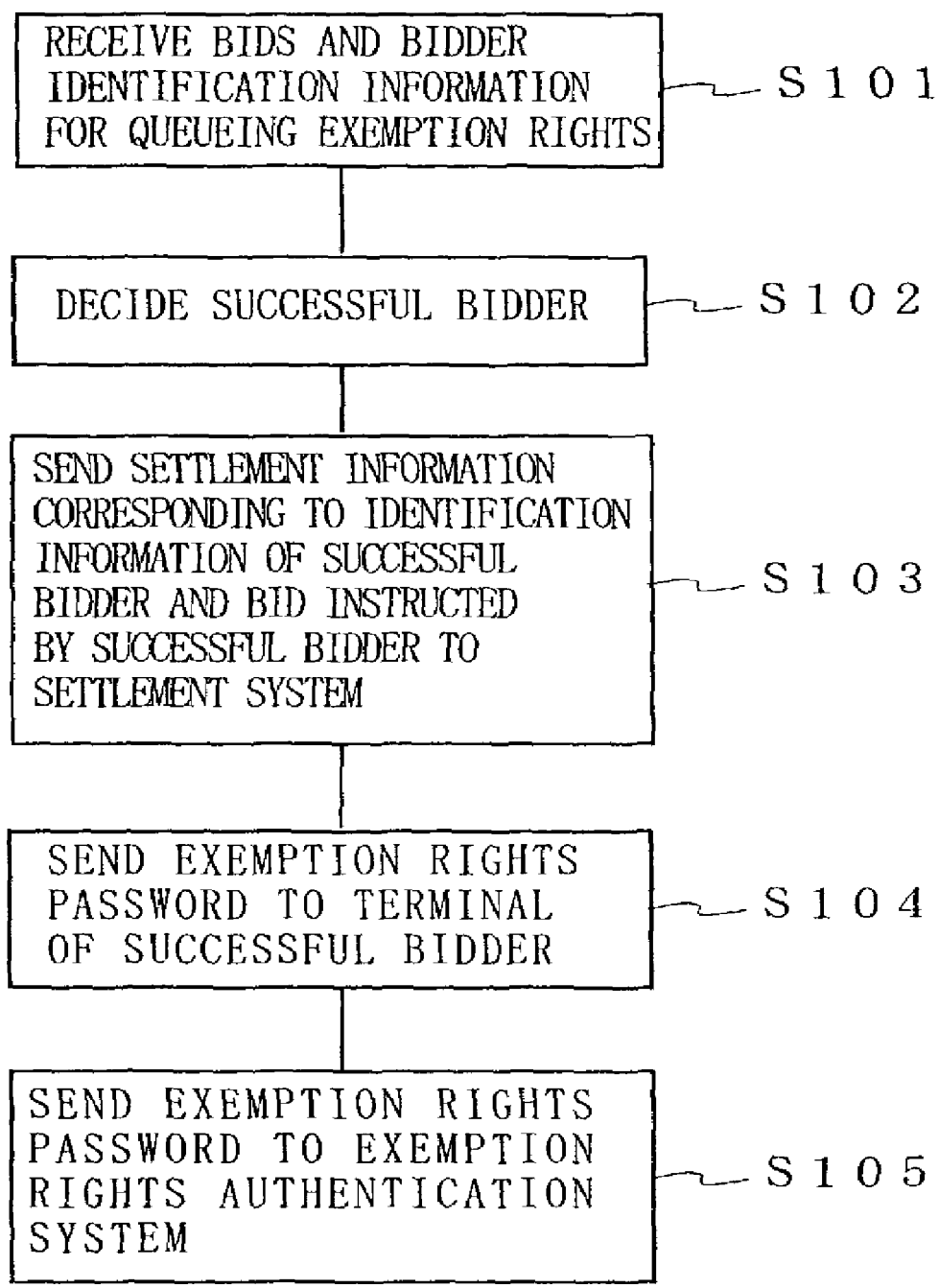
FIG. 3 is a flowchart showing processing for the auction system shown in FIG. 1.

Next, a description is given of the operation of this embodiment based on FIG. 3.

In this embodiment, the concert promoter registers queuing exemption rights corresponding to a few tens of concert tickets in the auction system 1 and this discussion will now progress on the assumption that bids are invited for the queuing exemption rights. An auction is then carried out a total of two times for a fixed period (for example, for ten days) before and after the day of sales for the tickets, with the auctioning of the queuing exemption rights corresponding to the number of tickets being carried out every ten minutes.

FIG. 3 is a flowchart showing processing for the auction system 1.

The bidder is connected to the auction system 1 from a bidder terminal 2 via the communication network 5 and a bid for the queuing exemption rights relating to the aforementioned concert tickets and bidder identification information are sent to the auction system 1. The processing means 101 of the auction system 1 correlates the bid for the queuing exemption rights and the bidder identification information and receives this information from the bidder terminal 2 via the communication means 104 (S101). Methods provided for the bidder identification information may be a method of inputting from the bidder terminal 2 or a method of taking the information from a storage device of the bidder terminal 2, etc. Bids for the queuing exemption rights may be arbitrarily decided by the bidder.

The processing means 101 then decides upon a bidder for which a bid satisfies the successful bidder conditions stored in the successful bid conditions storage means 106 as the successful bidder (S102).

Various content can be considered for the successful bid conditions but in this embodiment conditions are assumed where the bidder that provides the highest bid during the ten minute bidding period is taken to be the successful bidder.

The processing means 101reads settlement information correlating with the identification information of the successful bidder that has been decided upon from settlement information storage means 107, correlates the read-in settlement information and the bid provided by the decided upon successful bidder in order to perform settlement based on the read-out decided information on the bid provided by the successful bidder, and sends the correlated information to the settlement system 4 via the communication means 104 (S103). The settlement system 4 carries out settlement (for example, a transfer to the account of a provider) of successful bids.

The processing means 101 then reads an exemption rights password corresponding to the queuing exemption rights which the decided successful bidder has successfully bid for from the exemption rights storage means 105 and sends the exemption rights password to the terminal 2 of the successful bidder (S104).

The bidder terminal 2 is by no means limited to physically being one terminal, and may be a plurality of terminals providing the terminal can be operated by the bidder. The transmission method may be by e-mail, FAX, telephone or URL etc. This URL is an address of a web page for displaying an exemption rights password, with a successful bidder then accessing this URL and confirming the exemption rights password.

An example of a display screen including an exemption rights password is shown in FIG. 4.

The display screen shown in FIG. 4 is the screen displayed at the terminal 2 of the successful bidder and the successful bidder confirms the exemption rights password via this screen. The exemption rights password, name of concert related to the queuing exemption rights, a concert venue, time of commencement, amount of successful bid, time of successful bid and name of provider etc. can be included in the display screen of FIG. 4.

The processing means 101 determines whether or not the successful bidder professing to be the person in question is the same person as the decided upon successful bidder and sends the exemption rights password read out in step S103 to the external exemption rights authentication system 3 via the communication means 104 in order to determine the queuing exemption relating to the queuing exemption rights (S105).

In this embodiment, bids for queuing exemption rights are received, a successful bidder for the queuing exemption rights is decided upon, an exemption rights password corresponding to the queuing exemption rights is sent to the terminal 2 of the decided upon bidder, and the exemption rights password is sent to an exemption rights authentication system 3. As a result of successfully bidding for the queuing exemption rights, the successful bidder can purchase their concert ticket without having to wait in line at the concert hall. The concert promoter can then promote and publicize the concert through the bids and it is therefore possible to increase concert-related sales.

With this system, the bidder may be an individual or a corporation and the present invention may therefore take as its target all goods and services relating to queuing exemption rights including those between corporations and individuals, and between corporations and other corporations. It is then possible for all goods and services to be provided to all successful bidders without the successful bidders having to wait. By adopting this system, the provider can convey goods and services and it is therefore possible to increase sales of these goods and services.

According to this embodiment, the settlement information and the successful bid amount are made to correlate and are sent to the settlement system 4. It is therefore possible to carry out settlement of the successful bid made by the successful bidder based on this settlement information.

A description is now given of the operation by which the successful bidder uses the exemption rights password sent by the auction system 1.

Figure 5:
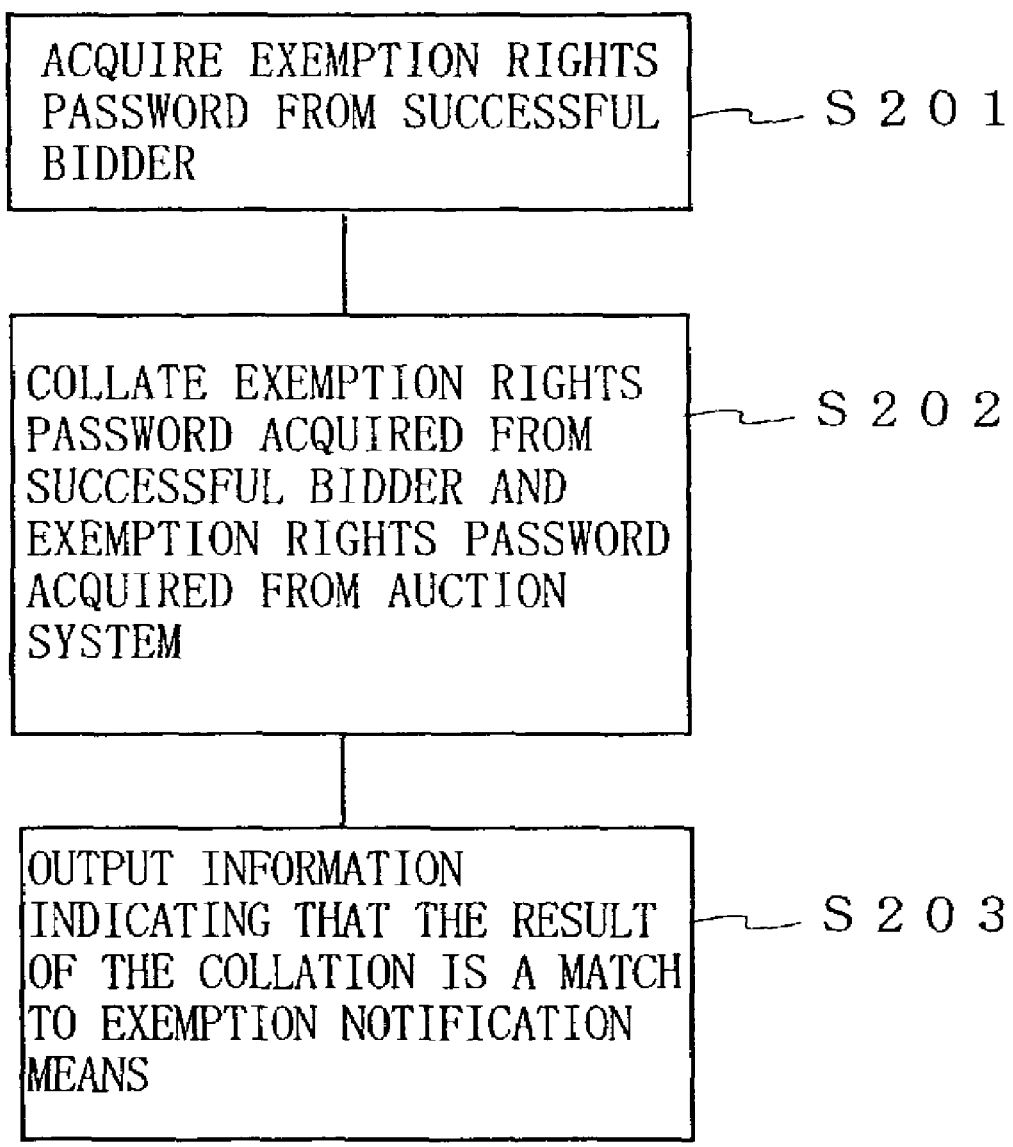
FIG. 5 is a flowchart showing processing for the exemption rights authentication system shown in FIG. 1.

FIG. 5 is a flowchart of the process executed by the processing means 101 of the exemption rights authentication system 3.

When the successful bidder inputs an exemption rights password into the exemption rights authentication system 3 at the concert venue, the processing means 101 of the exemption rights authentication system 3 acquires the exemption rights password from the successful bidder (S201). In this embodiment, this acquisition method may be acquisition by direct input to the exemption rights authentication system 3 through the operation of a touch-sensitive panel or keyboard, acquisition by a barcode reader in cases where the password is in the form of a barcode, etc., or acquisition by direct input to the exemption rights authentication system 3 using speech input. A method such as Bluetooth etc. is assumed as a method for the exemption rights authentication system 3 to acquire information from a bidder terminal 2 through wireless communication.

The processing means 101 then collates an exemption rights password acquired from the successful bidder and an exemption rights password acquired from the auction system 1 (S202). The exemption rights password acquired from the auction system 1 is managed at the information storage means 109 for the information for the exemption rights authentication system 3. Authentication of the exemption rights password may also be carried out jointly with that of the ID number and password of the successful bidder.

When the results of the collation occurring at the processing means 101 is a match, a signal indicating that the result of the collation is a match is output to the exemption notification means 31 in order to approve the queuing exemption rights (S203). Various means can be considered for the content of the exemption notification means 31 but in this embodiment this is assumed to be a display for displaying a signal indicating that the collation results are a match when this signal is received.

The indication that the collation results are a match is displayed on the exemption notification means 31. The ticket salesperson can then confirm that the exemption rights password utilized by the successful bidder on this occasion is appropriate and it is therefore possible for the ticket to be sold to the successful bidder without the successful bidder having to wait, in exchange for the queuing exemption rights.

On the other hand, when the successful bidder relinquishes their own queuing exemption rights, when information indicating this is sent to the auction system 1 from the bidder terminal 2, the processing means 101 of the auction system 1 receives information to this effect via the communication means 104, and a new exemption rights password corresponding to this queuing exemption rights password is registered in the exemption rights storage means 105 to enable bidding for the same queuing exemption rights as the relinquished queuing exemption rights to take place.

In this way, it is also possible to take bids for relinquished queuing exemption rights and it is possible for other successful bidders to receive provision of goods and services without having to wait in a line.

The present invention is by no means limited to the aforementioned embodiment. For example, the processing means 101 is by no means limited to being configured from a single CPU and may also include a plurality of computers carrying out distributed processing. The storage means may also physically be a single item or a plurality of items.

MODIFIED EXAMPLE 1

When information to the effect that concert tickets purchased through normal channels have been returned is received via the communication means 104, the processing means 101 of the auction system 1 correlates the queuing exemption rights with the exemption rights password and registers this in the exemption rights storage means 105 in order to enable bidding for the queuing exemption rights that enable the same tickets as the tickets that have been returned to be acquired without the need to wait in a line. In addition to the aforementioned mobile telephones and PDA's, bids for the queuing exemption rights may be made via terminals located in the concert halls.

MODIFIED EXAMPLE 2

The auction system 1 is equipped with successful bidder authentication information storage means (not shown) for storing successful bidder authentication information for confirming successful bidders that have bid for queuing exemption (added to make it make sense). When a bidder instructing a bid is decided upon as the successful bidder, the processing means 101 reads successful bidder authentication information from the successful bidder authentication information storage means together with an exemption rights password corresponding to the queuing exemption rights of the decided upon successful bidder and sends the successful bidder authentication information and the exemption rights password to the exemption rights authentication system 3. The successful bidder authentication information may be, for example, the name, attire, height, sex, and portrait photograph of the successful bidder. It is therefore possible to substantially increase the degree of safety and reliability of transactions as it is possible to confirm whether or not the person claiming to be the successful bidder is the person in question by using the successful bidder authentication information. For example, an attendant that is monitoring the exemption rights authentication system 3 on-site can then actually confirm with their own eyes whether or not the person claiming to be the successful bidder is the person in question.

Second Embodiment

Figure 6:
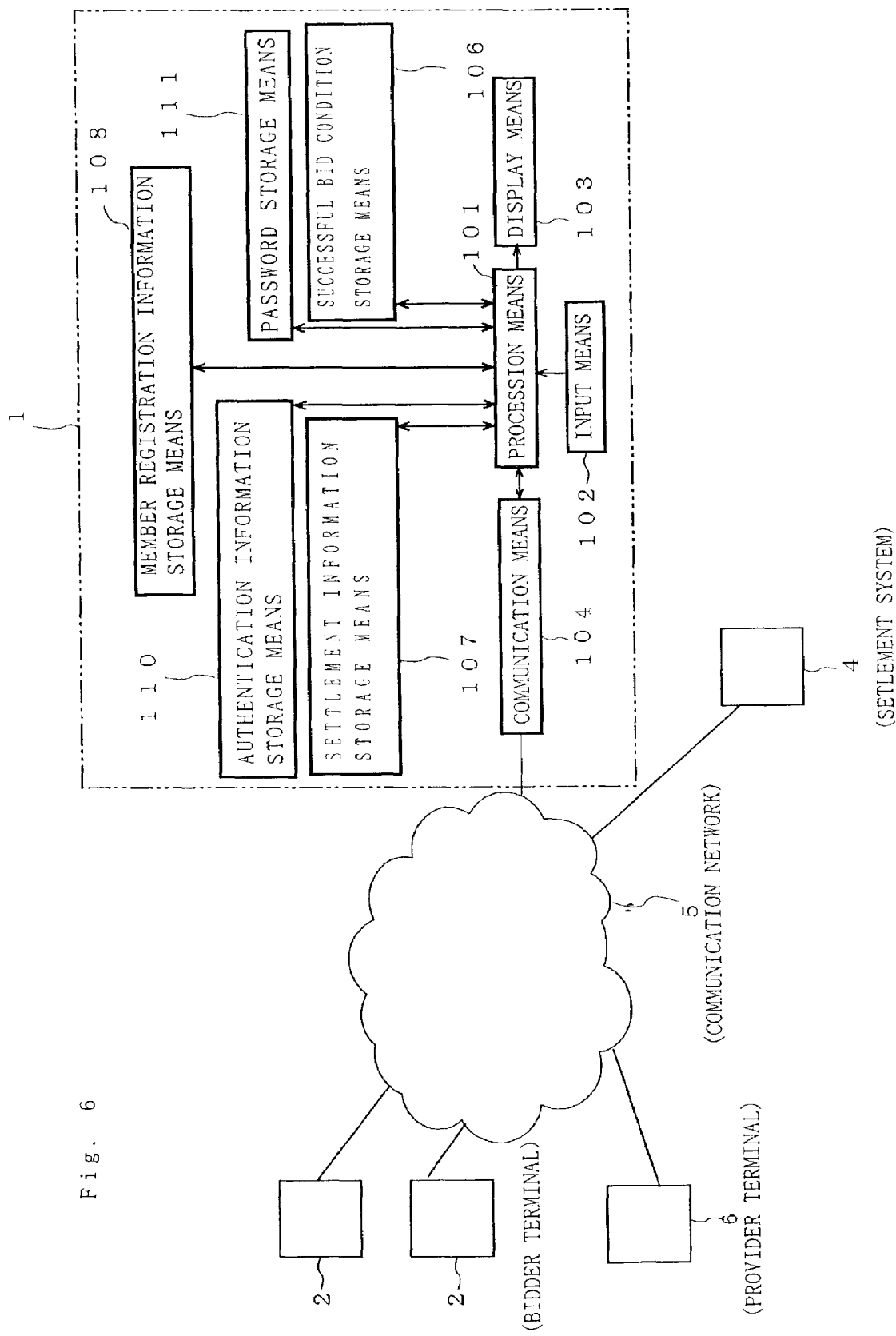
FIG. 6 shows a view of the configuration of the auction system shown in the second embodiment.

FIG. 6 shows the overall configuration of the second embodiment.

In the second embodiment shown in FIG. 6, the auction system 1 of the first embodiment is provided with an authentication information storage means 110 having an authentication information DB for correlating and storing queuing place-taking rights enabling changing of places with a provider who is queuing in order to receive goods or services, provider authentication information for confirming the queuing provider, and successful bidder authentication information for confirming the successful bidder that has bid successfully for the right to take a place in the queue.

The auction system 1 is characterized by being equipped with successful bid conditions storage means 106 for storing successful bid conditions for bidding successfully for queuing place-taking rights, queuing place-taking rights, a provider side place-taking rights password, and a successful bidder side place-taking rights password.

As with the first embodiment, the auction system 1 comprises settlement information storage means 107 for correlating and storing bidder identification information and settlement information for settling the bids, member registration information storage means 108, communication means .104 for communicating with external devices, and processing means 101 for information for controlling the operation of each of the means.

As with the first embodiment, the providing of the member registration information storage means 108 is provided because conditions are presumed in the utilization of this system such that the providers and bidders are both registered as members.

In FIG. 6, numeral 6 is a provider terminal. This may be any type but a mobile telephone or PDA etc. equipped with a data communication function is preferred. Other aspects of the configuration are substantially the same as in FIG. 1.

When this system is applied, the place of a provider waiting in a queue in order to receive provision of goods or services may be taken and the receipt of provision of goods and services can be implemented.

This is described in detail in the following.

As shown in FIG. 7(A), the authentication information DB correlates the queuing place-taking rights, the provider authentication information and the successful bidder authentication information.

The queuing place-taking rights are such that providing there is a person lining up in a queue in order to receive goods or services and a right to take this place in the queue, it does not matter what kind of goods or services the rights are for. However, in this embodiment it is assumed that the queuing place-taking rights are the rights to take a place in a queue in which a person has lined up in in order to receive services in a popular restaurant.

The provider authentication information is for searching out a provider from a queue and may, for example, include queuing information such as what position in the queue the provider is at, or the name, attire, height, sex, and portrait photograph of the provider.

The successful bidder authentication information is information for searching out a successful bidder, and may include, for example, the name, attire, height, sex, and portrait photograph of the successful bidder.

As shown in FIG. 7(B), the password DB mutually correlates the queuing place-taking rights, provider side place-taking rights password, and the successful bidder side place-taking rights password. The provider side place-taking rights password and the successful bidder side place-taking rights password are encoded as a combination of a random number and a cipher in a manner conforming to the SSL method and the processing means 101 is equipped with a function for encrypting both passwords.

In this embodiment, the processing means 101 receives bids for the queuing place-taking rights via the communication means 104.

The processing means 101 decides upon a bidder for which a bid is received that satisfies the successful bidder conditions stored in the successful bid conditions storage means 106 as the successful bidder.

The processing means 101 reads out provider authentication information corresponding to the queuing place-taking rights successfully bid for by the decided upon successful bidder and successful bidder authentication information from the authentication information DB of the authentication information storage means 109.

The processing means 101 reads out a provider side place-taking rights password corresponding to the queuing place-taking rights successfully bid for by the decided upon successful bidder, and a successful bidder side place-taking rights password from the password DB of password storage means 111.

The processing means 101 then sends the read out provider authentication information and the read out successful bidder side place-taking rights password to the terminal 2 of the decided upon successful bidder.

The processing means 101 then sends the read out successful bidder authentication information and the read out provider side place-taking rights password to the terminal 6 of the provider providing the queuing place-taking rights which the decided upon successful bidder has successfully bid for.

When the provider is waiting in the queue, the processing means 101 makes the successful bidder side place-taking rights password instructed by the successful bidder correspond with the queuing place-taking rights based on the successful bidder side place-taking rights password sent from the terminal 2 of the successful bidder and provider authentication information, and receives the correlated information from provider terminal 6 via communication means 104.

When the provider is waiting in the queue, the processing means 101 makes the provider side place-taking rights password instructed by the provider correlate with the queuing place-taking rights based on the provider side place-taking rights password sent from the terminal 6 of the provider and successful bidder authentication information, and receives the correlated information from the terminal 2 of the successful bidder via communication means 104.

The processing means 101 collates the correspondence correlation of the successful bidder side place-taking rights password relating to the received queuing place-taking rights and the provider side place-taking rights password relating to the received queuing place-taking rights and the correspondence correlation between the sent successful bidder side place-taking rights password and the sent provider side place-taking rights password, and sends information to the effect that the taking of the place in the queue is permitted to the terminal 2 of the successful bidder and the terminal 6 of the provider when the result of the collation is a match.

Figure 8:
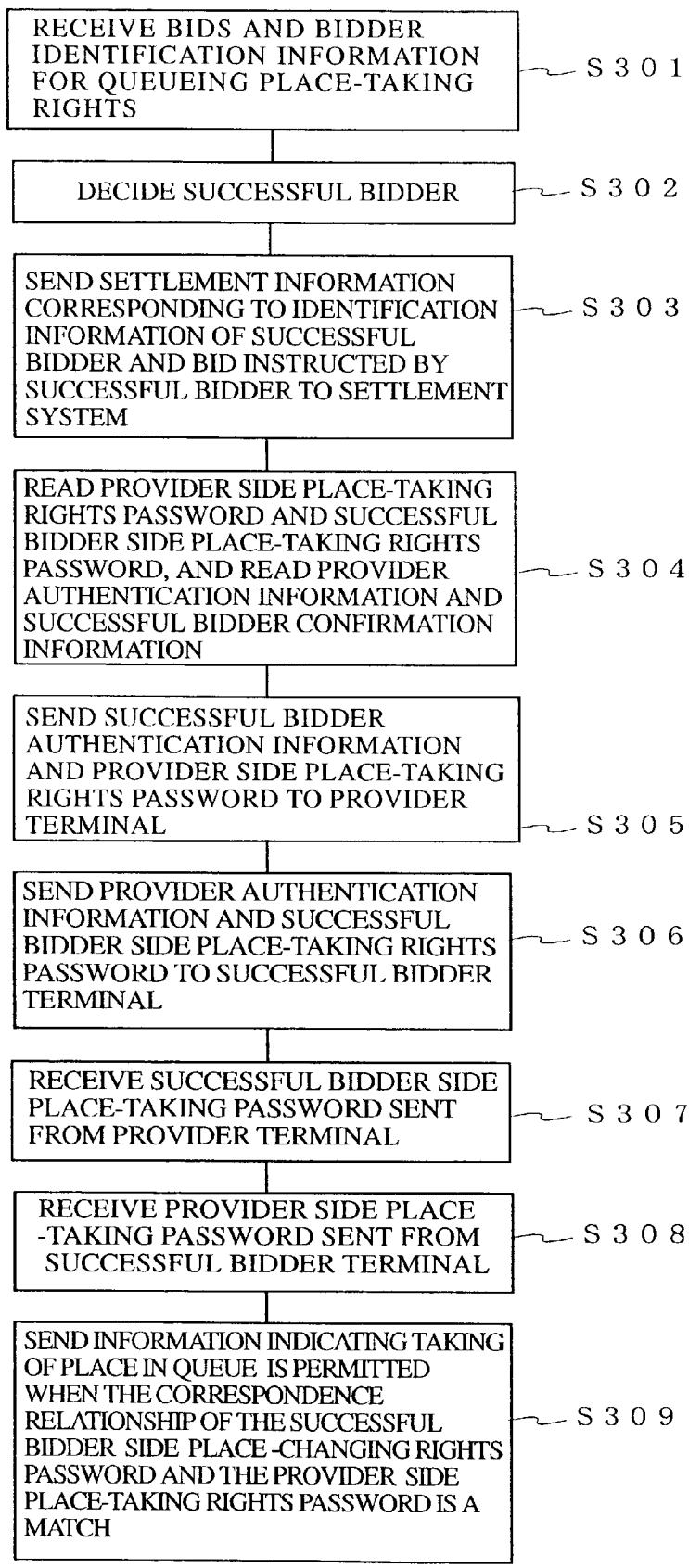
FIG. 8 is a flowchart showing processing for the auction system shown in FIG. 1.

Next, a description is given of the operation of this embodiment based on FIG. 8.

In this embodiment, the provider lined up in the queue for the popular restaurant gives up the provision of the services of the poplar restaurant, changes places in the queue, and the queuing place-taking rights are correlated with the provider authentication information and sent to the auction system 1 from the provider terminal 6. In doing so, this discussion proceeds on the assumption that the auction system 1 correlates the queuing place-taking rights with the provider authentication information and registers this in the authentication information storage means 110 and invites bids for the queuing place-taking rights.

FIG. 8 is a flowchart showing processing for the auction system 1.

The bidder is connected to the auction system 1 from a bidder terminal 2 via the communication network 5 and a bid for the queuing place-taking rights for receiving the services of the aforementioned popular restaurant and bidder identification information are sent to the auction system 1. The processing means 101 of the auction system 1 correlates the bid for the queuing place-taking rights and the bidder identification information and receives this information from the bidder terminal 2 via the communication means 104 (S301).

The processing means 101 then decides upon a bidder entering a bid that satisfies the successful bidder conditions stored in the successful bid conditions storage means 106 as the successful bidder (S302). Various conditions can be considered for the successful bid conditions but in this embodiment conditions are assumed where the first bidder to provide the bid desired by the provider is taken to be the successful bidder. The successful bid conditions are assumed to be as instructed by the provider.

The processing means 101 reads settlement information correlating with the identification information of the successful bidder that has been decided upon, correlates the read-out settlement information and the bid provided by the decided upon successful bidder in order to perform settlement based on the read-out decided information on the bid provided by the successful bidder, and sends this to the settlement system 4 via the communication means 104 (S303).

The processing means 101 reads out provider authentication information corresponding to the queuing place-taking rights successfully bid for by the decided upon successful bidder and successful bidder authentication information from the authentication information DB of the authentication information storage means 110 and reads out a provider side place-taking rights password corresponding to the queuing place-taking rights successfully bid for by the decided upon successful bidder, and a successful bidder side place-taking rights password from the password DB of password storage means 111 (S304).

The processing means 101 then sends the read out successful bidder authentication information and the read out provider side place-taking rights password to the terminal 6 of the provider providing the queuing place-taking rights which the decided upon successful bidder has successfully bid for (S305). The transmission method may be by e-mail, FAX, telephone or URL etc.

The processing means 101 then sends the read out provider authentication information and the read out successful bidder side place-taking rights password to the terminal 2 of the decided upon successful bidder (S306). A portable mobile telephone or PDA is preferred as the bidder terminal 2. This is because it is necessary for the successful bidder to find the provider.

FIG. 9(A) is an example of a screen showing the successful bidder side place-taking rights password and the provider authentication information received by the terminal 2 of the successful bidder from the auction system 1.

The screen shown in FIG. 9(A) may include a successful bidder side place-taking rights password, provider authentication information, names of popular restaurants, location of queue, date of queuing, successful bid, and provider side place-taking rights password input column. This input column is described later. Information relating to, for example, provider name, provider attire, figure, portrait photograph, sex, height etc. is assumed as the provider authentication information, the successful bidder confirms the provider authentication information and the provider waiting in the queue is searched out. When the successful bidder searches out the provider, the successful bidder then presents the successful bidder side place-taking rights password to the provider.

FIG. 9(B) is an example of a screen showing the provider side place-taking rights password and the successful bidder authentication information received by the terminal 6 of the provider from the auction system 1.

The screen shown in FIG. 9(B) may include a provider side place-taking rights password, successful bidder authentication information, names of popular goods and services, successful bid, and successful bidder side place-taking rights password input column. This input column is described later. Information relating to, for example, the successful bidder name and attire, figure, portrait photograph, sex and height etc. is assumed as the successful bidder authentication information, the successful bidder authentication information is confirmed and a successful bidder that has bid successfully for the queuing place-taking rights is searched out. When the provider then confirms the successful bidder, the provider shows the provider-side place-taking rights password to the successful bidder.

When waiting in the queue, the provider operates the terminal 6, and correlates and inputs successful bidder side place-taking rights password from the successful bidder with the queuing place-taking rights. This input method corresponds, for example, to the method of inputting the successful bidder side place-taking rights password to the input column of the screen displayed in FIG. 9(B) displayed at the terminal 6 but the method is by no means limited in this respect.

The provider sends a successful bidder side place-taking rights password to the auction system 1. In doing so, the processing means 101 of the auction system 1 makes the successful bidder side place-taking rights password instructed by the successful bidder correspond with the queuing place-taking rights based on the successful bidder side place-taking rights password sent from the terminal 2 of the successful bidder and provider authentication information, and receives the correlated information from provider terminal 6 via communication means 104 (S307).

When the provider is waiting in the queue, the successful bidder operates the terminal 2, and correlates and inputs the provider side place-taking rights password from the provider with the queuing place-taking rights. This input method corresponds, for example, to the method of inputting the successful bidder side place-taking rights password to the input column of the screen displayed in FIG. 9(A) displayed at the terminal 6 but the method is by no means limited in this respect.

The successful bidder sends a provider side place-taking rights password to the auction system 1 from the terminal 2. In doing so, the processing means 101 of the auction system 1 makes the provider side place-taking rights password instructed by the provider correspond with the queuing place-taking rights based on the provider side place-taking rights password sent from the terminal 2 of the provider and successful bidder authentication information, and receives the correlated information from the terminal 2 of the successful bidder via communication means 104 (S308).

The processing means 101 collates the correspondence correlation of the successful bidder side place-taking rights password relating to the queuing place-taking rights received from the terminal 6 and the provider side place-taking rights password received from the terminal 2 and the correspondence correlation between the sent successful bidder side place-taking rights password and the sent provider side place-taking rights password, and sends information to the effect that the taking of the place in the queue is permitted to the terminal 6 of the provider and the terminal 2 of the successful bidder when the result of the collation is a match (S309). The processing means 101 may also transmit to just one of the terminal 6 or the terminal 2.

When the provider and the successful bidder have confirmed the information giving permission to change places in the queue, the provider gives up their place in the queue to the successful bidder.

In this embodiment, the processing means 101 of the auction system 1 sends the successful bidder side place-taking rights password and the provider authentication information to the terminal 2 that has successfully bid for the queuing place-taking rights and sends the provider side place-taking rights password and the successful bidder authentication information to the terminal 6 of the provider. The processing means 101 then sends information to the effect that the taking of the place in the queue is permitted to the terminal 6 of the provider and the terminal 2 of the successful bidder when matching of the correspondence correlation of the successful bidder side place-taking rights password and the provider side place-taking rights password is confirmed. It is therefore possible for the provider to change the time spent waiting in a queue for a monetary value and for the successful bidder to change places in a queue with the provider in exchange for a monetary value and receive the services of a popular restaurant.

According to this embodiment, the processing means sends the settlement information and the successful bid amount to the settlement system. It is therefore possible to carry out settlement for the successful bidder. The provider can therefore be remunerated for time spent lining up in the queue.

MODIFIED EXAMPLE

In the above embodiment, a procedure is shown where the processing means 101 collates the correspondence correlation between the successful bidder side place-taking rights password and the provider side place-taking rights password but the processing means 101 may also sequentially collate just one of the successful bidder side place-taking rights password and the provider side place-taking rights password. The collation procedure is described for the case where the collation procedure is in the order of successful bidder side place-taking rights password and then provider side place-taking rights password but the collation order may also be in the order of provider side place-taking rights password followed by successful bidder side place-taking rights password.

For example, in the receiving process in step S307 and step S308 described above, while the provider is waiting in the queue, the processing means 101 of the auction system 1 first correlates the successful bidder side place-taking rights password with the queuing place-taking rights based on the provider authentication information sent from the terminal 2 of the successful bidder and the successful bidder side place-taking rights password and receives this from the terminal 6 of the provider via the communication means 104 (S307-1).

Next, the processing means 101 collates the received successful bidder side place-taking rights password and the successful bidder side place-taking rights password occurring in the transmission process of step S306 described above. When the result of the collation is a match, transmission of the successful bidder side place-taking rights password is requested at the terminal 2 of the successful bidder (S307-2).

Next, while the provider is waiting in the queue, the processing means 101 makes the successful bidder side place-taking rights password instructed by the provider correlate with the queuing place-taking rights based on the successful bidder authentication information sent from the terminal 6 of the provider and provider side place-taking rights password, and receives the correlated information from the terminal 2 of the successful bidder via communication means 104 (S308-1).

Then, in a transmission process of the aforementioned step S309, the processing means 101 collates the received provider-side place-taking rights password and the provider side place-taking rights password occurring in the transmission process of step S305 described above. When the result of the collation is a match, information to the effect that changing of the place in the queue is permitted is sent to the terminal 6 of the provider and the terminal 2 of the successful bidder (S309-1).

The present invention is by no means limited to the aforementioned embodiment. For example, the processing means 101 is by no means limited to being configured from a single CPU and may also include a plurality of computers carrying out distributed processing. The storage means may also physically be a single item or a plurality of items. An example is shown here where the bidder terminal 2 and the provider terminal 6 are provided independently but it is also possible for a single terminal device to function as both a bidder terminal and a provider terminal.

By functioning with the configuration described above, in the present invention, an auction system decides upon a successful bidder for queuing exemption rights and an exemption rights authentication system authenticates the aforementioned exemption rights password and outputs a signal indicating the results of a collation is a match to exemption notification means. The successful bidder can then receive the provision of goods and services without having to wait by acquiring the queuing exemption rights.

According to the present invention, an auction system decides upon a successful bidder for queuing place-taking rights, collates a correspondence correlation of a successful bidder side password corresponding to the place-taking rights and a provider side password and sends information indicating that the giving up of a place in the queue is permitted to the terminal of the successful bidder and/or the terminal of the provider. It is therefore possible for the successful bidder to take a place in a queue and receive the provision of goods and services by successfully bidding for the right to change places in a queue and the provider can receive remuneration for the waiting time.

When the auction system sends the settlement information and the successful bid amount to the settlement system, settlement of the amount successfully bid can be reliably carried out.

When the auction system then takes bids for relinquished queuing exemption rights, it is possible for other successful bidders to receive provision of goods and services without having to wait in a line.

It is therefore possible to provide a queuing exemption method, queuing place-taking method and auction system that does not exist in the related art for exchanging waiting time, troublesomeness, and labor incurred in the receiving of goods and services for a monetary value so as to acquire a priority with respect to the provision of goods and services.

What is claimed is:

1. A queuing place-taking method in an environment including a terminal of a provider waiting in a queue to receive provision of goods/services, a system for auctioning queuing place-taking rights to take the place of the provider in a queue, and terminals of bidders bidding for the queue place-taking rights, the method comprising:
   a) the bidder terminals executing a step of sending bids for queue place-taking rights to the auction system;
   b) the auction system executing a step of receiving bids for the queue place-taking rights from the bidder terminals, deciding upon a successful bidder for the queuing place-taking rights, sending a successful bidder side place-taking rights password corresponding to the queuing place-taking rights and provider authentication information for confirming the provider waiting in the queue to the terminal of the decided upon successful bidder, and sending a provider side place-taking rights password corresponding to the queuing place-taking rights and successful bidder authentication information for confirming the successful bidder to the terminal of the provider;
   c) the provider terminal executing a step of when the provider is waiting in the queue, correlating a successful bidder side place-taking rights password instructed by the successful bidder with the queuing place-taking rights based on the successful bidder side place-taking rights password and provider authentication information sent from the terminal of the successful bidder, and sending the correlated information to the auction system;

d) the terminal of the successful bidder executing a step of when the provider is waiting in the queue, correlating the provider side place-taking rights password instructed by the provider with the queuing place-taking rights based on the provider side place-taking rights password sent from the terminal of the provider and successful bidder authentication information, and sending the corresponding information to the auction system; and e) the auction system executing a step of collating the correspondence correlation of the successful bidder side place-taking rights password relating to the queuing place-taking rights received from the provider terminal in step c and the provider side place-taking rights password relating to the queuing place-taking rights received from the terminal of the successful bidder in step d and the correspondence correlation between the successful bidder side place-taking rights password and the provider side place-taking rights password sent in step b, and sending information to the effect that the taking of the place in the queue is permitted to the terminal of the successful bidder and the terminal of the provider when the result of the collation is a match.

2. An auction system employing a queue place-taking the auction system comprising:

authentication information storage means for correlating and storing queuing place-taking rights enabling changing of places with a provider who is queuing in order to receive goods or services and provider authentication information for confirming the provider waiting in the queue;

successful bid conditions storage means for storing successful bid conditions for bidding successfully for queuing place-taking rights;

password storage means for correlating and storing the queue place-taking rights, the provider side place-taking rights password and the successful bidder side place-taking rights password;

communication means for communicating with external devices; and information processing means for controlling the operation of each means, processing means executing the steps of:

a) receiving bids for the queuing place-taking rights via the communication means, b) deciding upon a bidder for which a bid is received satisfying the successful bidder conditions stored in the successful bid conditions storage means as the successful bidder, c) reading out provider authentication information corresponding to the queuing place-taking rights successfully bid for by the decided upon successful bidder and successful bidder authentication information from the authentication information storage means, d) reading out a provider side place-taking rights password corresponding to the queuing place-taking rights successfully bid for by the successful bidder decided upon in step b, and a successful bidder side place-taking rights password from the password storage means, e) sending the provider authentication information read out in step c and the successful bidder side place-taking rights password read out in step d to the terminal of the successful bidder decided upon in step b, f) sending the successful bidder authentication information read out in step c and the provider side place-taking rights password read out in step d to the terminal of the provider of the queuing place-taking rights successfully bid for by the successful bidder decided upon in step b, g) when the provider is waiting in the queue, making the successful bidder side place-taking rights password instructed by the successful bidder correspond with the queuing place-taking rights based on the successful bidder side place-taking rights password sent from the terminal of the successful bidder in step e and provider authentication information, and receiving the correlated information from the provider terminal via the communication means, h) when the provider is waiting in the queue, making the provider side place-taking rights password instructed by the provider correspond with the queuing place-taking rights based on the provider side place-taking rights password sent from the provider terminal in step f and successful bidder authentication information, and receiving this information from the successful bidder terminal via the communication means, and j) collating the correspondence correlation of the successful bidder side place-taking rights password relating to the queuing place-taking rights received in step g and the provider side place-taking rights password relating to the queuing place-taking rights received in step h and the correspondence correlation between the successful bidder side place-taking rights password sent in step e and the provider side place-taking rights password sent in step f, and sending information to the effect that the taking of the place in the queue is permitted to the terminal of the successful bidder and the terminal of the provider when the result of the collation is a match.

3. The auction system of claim 2, further comprising:

settlement information storage means for correlating and storing bidder identification information and settlement information for settling the bids, and the processing means receives the correlation between a bid for the queuing place-taking rights and the bidder identification information via the communication means, and when a successful bidder fulfilling the successful bidding conditions stored in the successful bid conditions storage means is decided upon in step b, reads settlement information relating to the identification information of the successful bidder that has been decided upon from the settlement information storage means, correlates the read settlement information and the bid instructed by the decided upon successful bidder in order to settle the bid instructed by the successful bidder based on the read out settlement information, and sends this to an external settlement system via the communication means.

* * * * *